Figure 1:
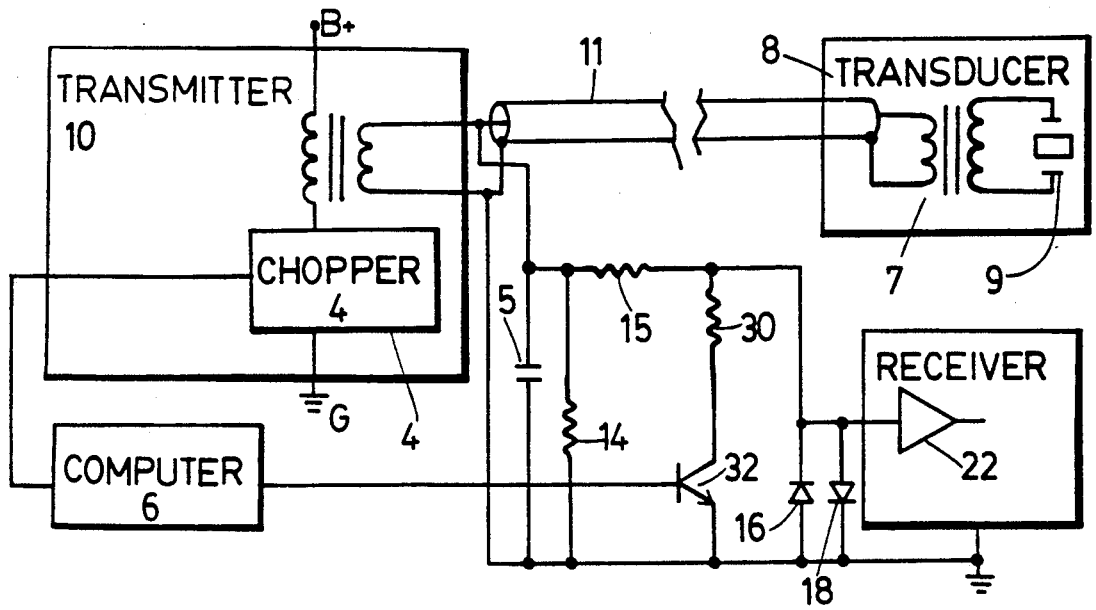

United States Patent [19]

Woodward

[11] Patent Number: 5,267,219
[45] Date of Patent: Nov. 30, 1993

[54] ACOUSTIC RANGE-FINDING SYSTEM

[75] Inventor: Steven J. Woodward, Port Hope, Canada

[73] Assignee: Milltronics Ltd., Peterborough, Canada

[21] Appl. No.: 914,532

[22] Filed: Jul. 17, 1992

[51] Int. Cl.⁵ ............................................. G01S 15/00
[52] U.S. Cl. ..................................... 367/99; 367/903
[58] Field of Search ..................... 367/903, 3, 99, 135; 381/55

[56] References Cited

U.S. PATENT DOCUMENTS

| | | | |
|---|---|---|---|
| 4,199,246 | 4/1980 | Muggli | 367/101 |
| 4,255,800 | 3/1981 | Patterson | 367/99 |
| 4,439,846 | 3/1984 | Rodriguez | 367/99 |
| 4,596,144 | 6/1986 | Panton et al. | 73/290 V |
| 4,831,565 | 5/1989 | Woodward | 367/99 |
| 4,850,226 | 7/1989 | Allen, Jr. et al. | 367/903 |
| 4,890,266 | 12/1989 | Woodward | 367/99 |
| 4,992,998 | 2/1991 | Woodward | 367/99 |
| 5,079,751 | 1/1992 | Woodward | 367/99 |
| 5,132,940 | 7/1992 | Culbert | 367/135 |

FOREIGN PATENT DOCUMENTS 2151357A 7/1985 United Kingdom .

Primary Examiner—Daniel T. Pihulic
Attorney, Agent, or Firm—Ridout & Maybee

[57] ABSTRACT

In an acoustic pulse-echo ranging system, a high impedance piezoelectric transducer element is connected via a transformer to a transmitter, and also directly to a high impedance input of a receiver through a network, in parallel with the transducer element which includes a limiting resistor having a value which is low compared with the impedance of the transducer and a pair of oppositely connected diodes connected across the receiver input, the diodes being in series with the resistor and conducting to complete a damping circuit for large amplitude signals during transmission, and to limit the amplitude of signals applied to the receiver. When the signals are not of sufficient amplitude to cause the diodes to conduct, the damping circuit is normally rendered ineffective, but a further circuit is provided in parallel with the diodes to selectively switch into the network a further smaller resistance which acts both to form an attenuator at the receiver input in conjunction with the damping resistor, and to restore the damping effect. By this means, the dynamic range required by the receiver is much reduced, and effective damping can be applied selectively during reception to reduce the effect of ringing at short ranges. A tuned circuit formed with the transducer by the transformer through which the transmitter drives the transducer is tuned by means of an air gap in the transformer core, which may be adjustable.

6 Claims, 1 Drawing Sheet

ACOUSTIC RANGE-FINDING SYSTEM

BACKGROUND OF THE INVENTION

1. Field of the Invention

This invention relates to acoustic range finding systems of the type in which an electro-acoustic transducer transmits a pulse or shot of acoustic energy towards a surface whose distance is to be measured, and subsequent signals received from the transducer are monitored to determine the temporal location of an echo from that surface.

2. Review of the Art

In such a system, various compromises are necessary in accommodating the characteristics of the transducer and its associated transmitter and receiver. The reactances of the transducer and of circuits coupling the transducers to the transmitter and receiver form a tuned circuit resonant at a frequency at or near the operating frequency of the transducer, and the quality factor or Q of this circuit has a profound effect upon the amplitude of the acoustic energy generated, the sensitivity of the transducer to return echoes, and the amplitude and rate of decay of the "ringing" of the transducer following transmission of the shot. The higher the Q, the greater the amplitude and sensitivity, but also the greater the ringing, which may severely affect the ability of the system to detect close-in echoes since these may either be swamped by the ringing, or rendered undetectable through saturation of the receiver caused by high amplitude ringing. In actual systems such as those described in commonly assigned prior U.S. Pat. Nos. 4,831,565; 4,890,266; 4,992,998 and 5,079,751, the input of the receiver is protected against high amplitude signals from the transmitter by placing opposite polarity pairs of limiting diodes at the input of the receiver, in series with a limiting resistor or resistors, such that during operation of the transmitter the diodes conduct. The limiting resistor acts both to protect the receiver, and to prevent too large a proportion of the transmitter energy being dissipated in the diodes. The resistor or resistors also apply some limited damping (i.e. reducing the Q) to the transducer circuit. During reception of low amplitude echo signals, the diodes cease to conduct, thus placing the resistor or resistors in series with a higher impedance or impedances presented by the receiver input and somewhat reducing the damping so as to provide improved sensitivity and noise immunity during reception. Whilst this arrangement works well, it still requires design compromises. The ringing characteristics of the transducer circuit are difficult to control closely due to varying characteristics of individual transducers, the reactance and resistance of varying lengths of transmission line connecting them to the transmitter, and imperfections of the impedance matching transformer usually located between the active element of the transducer and the transmission line. These factors mean that the limiting resistor or resistors can exercise only a small degree of control over damping of the transducer. Sufficient damping must be applied to ensure that clipping by the diodes will cease and the receiver will be unsaturated within a time, following the start of a shot, corresponding to the minimum range to be measured. Whilst various techniques, such as shortened shots, may be used to provide a short minimum range, the receiver requires a very large dynamic range to accommodate the extreme differences in signal amplitude existing between short range and distant echoes. This in turn has tended to require the use of arrangements such as those disclosed in U.S. Pat. No. 4,596,144 (Panton et al.), using multiple logarithmic amplifiers, to provide the necessary dynamic range. An alternative approach has been to place an electronically switchable attenuator at the input to the receiver which is switched in for short range shots only in order to reduce the dynamic range required in the receiver. Such an arrangement is used in the MULTIRANGER (trade-mark) system of the assignee of this application.

Yet another approach has been to utilize variable gain control of the receiver; see for example U.S. Pat. No. 4,439,846 (Rodriguez) which represents a development of the Muggli patent discussed below. Satisfactory wide range gain control can present considerable implementation problems and leaves the necessity for the receiver to cope with a very wide range of signal amplitudes at its input.

U.S. Pat. No. 4,199,246 (Muggli), issued Apr. 22, 1980, describes an ultrasonic ranging system in which the transmitter is driven by a voltage controlled oscillator, such that the frequency transmitted by the transducer is changed in a predetermined manner over a substantial range during the course of the transmitted pulse. The bandwidth of the receiver is varied, again according to a preset pattern, during a subsequent period by changing the receiving Q so that the receiver bandwidth is narrowed with the passage of time following the pulse, the passband of the receiver being centred upon the lowest frequency transmitted. By configuring the transmitted pulse so that a short initial portion is transmitted at a relatively high frequency, which is then reduced in one or more steps to a relatively low frequency, and configuring the receiver so that its initial bandwidth is wide enough to pass the highest as well as the lowest frequency, short range echoes of the high frequency pulse components may be detected, but at longer ranges, reception of the low frequency component and exclusion of noise is optimized, by decreasing the bandwidth and thus improving the quality factor (Q) of the receiver. The variable Q circuit used in the receiver only however affects the receiver circuits, and does not vary the damping applied to the transducer itself, whose characteristics remain unmodified. The dynamic range of the signals appearing at the receiver input is thus unmodified.

The Muggli system is subject to two constraints which limit its applicability. The transducer itself must be capable of operation over a wide range of frequencies, and the noise immunity of the system at short ranges is very poor because of the wide bandwidth of the receiver at those frequencies. Neither of these limitations need be serious in the camera control applications for which the Muggli system is clearly primarily designed, involving as they do low power transducers, comparatively short ranges, and environments which are comparatively noise-free at the frequencies of interest; they are however highly significant in typical industrial applications for which suitable transducers operating over a wide frequency range are not generally available. Instead it has been necessary to select a suitable transducer, and to provide a transmitter/receiver system whose frequency characteristics and output voltage are matched to the transducer.

U.S Pat. No. 5,079,751 discloses a control unit for connection to at least one electroacoustic transducer to form an acoustic ranging system, comprising a transmitter for generating shots of alternating current electric energy for application to each said transducer to generate acoustic energy, a tuned receiver for receiving and amplifying alternating current generated by each said transducer responsive to the receipt of acoustic energy, means for digitizing output from said receiver, and a control computer controlling said transmitter to time said shots and for processing said digitized receiver output to recognize therein features indicative of a primary echo from a target being ranged, said unit further including first electronically controlled means for determining an operating frequency of said transmitter, and second electronically controlled means for causing the tuning of said receiver to track the operating frequency of said transmitter, and said control computer further controlling said first electronically controlled means to determine the frequency of the transmitter during each shot responsive to data relative to characteristics of each said transducer.

As well as the frequency related control mentioned above, the patent also discloses how a main loading resistor connected in parallel with the transmitter can be associated with an additional resistor which is switched into parallel with the main loading resistor to adjust somewhat the damping of the transducer and thus its Q or quality factor. The optimum amount of damping may of course vary according to the transducer utilized, hence my incorporation of means to modify the damping in the unit which forms the subject of the above application, according to the characteristics of the transducer utilized during each shot.

In practice the additional resistor has, as already discussed, only a limited effect on the ringing characteristics of a transducer, since a typical transducer in a multi-transducer array such as is contemplated in U.S. Pat. No. 5,079,751 will necessarily be in most instances remote from the transceiver. Transducers suitable for such application incorporate a built-in transformer so that the connecting cable to the transducers may operate at relatively low impedance, and the combination of the imperfections of the built-in transformer and the reactance of the cables will mean that only limited damping can be applied by the additional resistor even if its value is so low as to severely limit the transmitter output. The arrangement is thus only suitable for achieving such minor adjustments of ringing characteristics as are necessary to suit different transducers.

With the continuing decrease in the cost of implementing even quite sophisticated electronic digital signal processing, it becomes increasingly practical to carry out echo processing at a location adjacent the transducer, the resulting range information being monitored at a remote location. It has been known for some time to provide local preprocessing of echo data adjacent the transducer, for example from published U.K. Patent Application 2151357A (Endress & Hauser GmbH & Co.), in order to facilitate transmission of the data to a remote processing unit, and more recently systems have appeared in which the data processing also has been carried out adjacent the transducer.

SUMMARY OF THE INVENTION

I have now found that, where signal processing is carried out adjacent the transducer, it is possible to use a technique superficially similar (in that it relies upon switching in an additional resistor in a resistive network) to that disclosed in U.S. Pat. No. 5,079,751, but in systems designed for use with one particular transducer type in order to optimize performance at different ranges, by employing a circuit at the receiver input which acts at the same time both to provide variable damping of the transducer and variable attenuation of the receiver input.

I modify the receiver input circuit already described above, which, in its existing form applies additional damping to the transducer circuit only when the signal level is above the clipping level of the diodes during and immediately following the transmission of a shot, by selectively causing a resistive load to appear directly in parallel with the piezoelectric transducer element during some circumstances of operation of the receiver. In a preferred arrangement such a resistance forms a potential divider in conjunction with the limiting resistor, and thus attenuates the input to the receiver in a defined proportion. At the same time it appears, when in circuit, in series with the limiting resistor to apply substantial damping to the transducer circuit during reception, thus increasing the rate of decay of ringing and decreasing sensitivity of the transducer. The resistive load is applied only when detecting short range echoes, or when exceptionally high received signal amplitudes are present which would otherwise saturate the receiver, both conditions which are readily detected. A large measure of signal attenuation and damping of ringing can be applied where the value of the resistive loading is much less both than that of the limiting resistor and that of the input impedance of the receiver. This is acceptable and indeed desirable when received signal amplitudes are large, and the dynamic range which must be handled by the amplifier is much reduced, thus enabling the latter to be simplified. It should be understood that, for the invention to operate effectively, the resistive loading must appear directly in parallel with the high impedance piezoelectric element itself, without the imposition of a matching transformer and a possibly lengthy transmission line as occurs in prior art arrangements.

SHORT DESCRIPTION OF THE DRAWINGS

Figure 2:
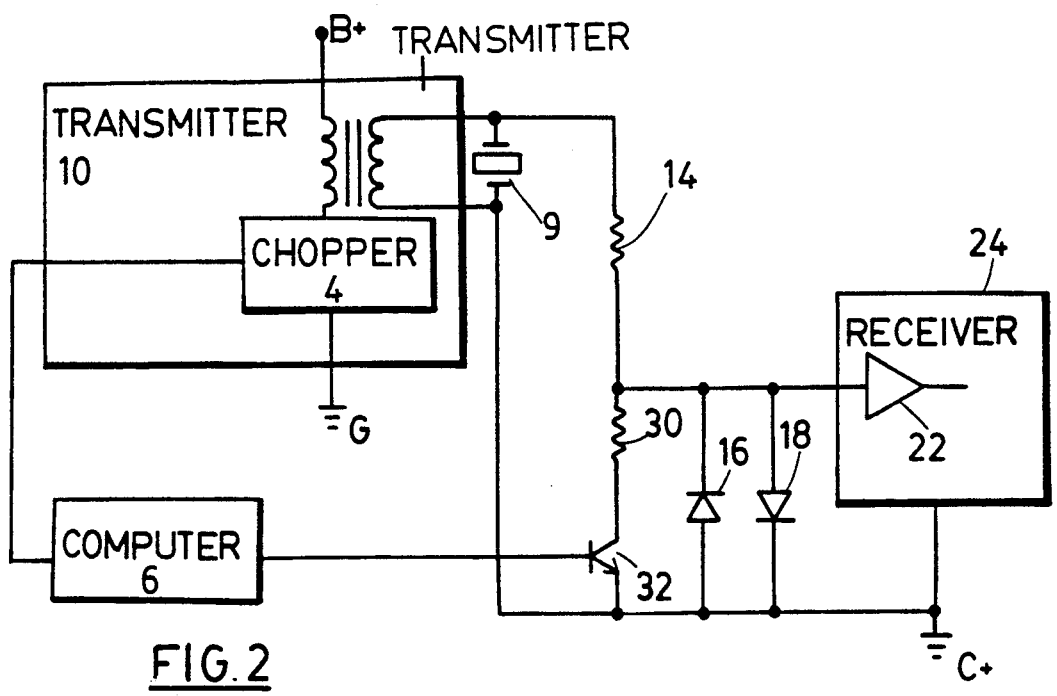

FIG. 1 is a simplified schematic diagram of an interface between a transducer and acoustic transceiver showing a prior art arrangement; and FIG. 2 is a simplified schematic diagram of an interface between a transducer and an acoustic transceiver in accordance with the invention.

Referring to FIG. 1, a transmitter 2 is conventional, comprising a source of direct current schematized by terminals B+ and G, a chopper circuit 4, typically formed by a VFET (vertical field effect transistor) driven by a bipolar transistor fed with digital control signals from a control computer 6, which causes a burst or "shot" of acoustic energy to be generated by turning the chopper on and off through a defined number of cycles for defined periods at a defined repetition frequency, according to the length of shot required and the resonant frequency of a piezoelectric acoustic transducer 8. The chopper 4 is in series with the primary of a double wound transformer 10, whose secondary winding is connected to a transducer 8 by a transmission line 11, which may be a coaxial cable or twisted pair of any required length up to several hundred meters. In order to match this transmission line, and reduce the effect of the reactance of the line which will vary greatly according to its length, the transducer 8 includes, as well as piezoelectric element 9, a matching transformer 7 which steps down the characteristically high impedance of the piezoelectric element 9 to a much lower impedance, typically 400Ω. At its transceiver end the transmission line 11 is terminated by a transceiver interface circuit, including a capacitor 5, which is selected so as to swamp the capacitance of the line and very approximately resonate with the inductive elements of the circuit at the frequency of the transducer, and a resistance network, comprising resistors 14, 15 and 30, the latter in parallel with back-to-back diodes 16 and 18. The values of resistors 14 and 15 are comparatively high (typically 2000 ohms) compared with the input impedance of the transducer (400Ω). The purpose of the resistor 15 is to improve the matching of the transmitter to the transmission line, and to ensure some loading of the transmitter to protect the chopper in the event of an open transducer circuit. As described in U.S. Pat. No. 5,079,751, such a resistor may be switched in on of circuit to help adjust the matching of a particular transducer to the transmitter. During transmission, the resistor 14 also appears in parallel with resistor 15, but like resistor 13 it is of comparatively high value (2000 ohms) compared with the input impedance of the transducer so that it has comparatively little effect upon the damping of the latter. During a transmit pulse or high amplitude ringing of the transducer, the diodes 16 and 18 will conduct, placing resistor 14 in parallel with resistor 15, and the same will occur when a switching transistor 32 is turned on, placing a low value (typically 25 ohms) resistor 30 in parallel with the diodes. In this latter case, it is more significant the resistor 30 is placed in parallel with the much higher impedance input of a receiver preamplifier 22, and in series with the resistor 30, thus forming a potential divider which acts as an input attenuator to the receiver. This transistor 32 controlling this attenuator is turned on when measuring short ranges, thus reducing the dynamic range needed by the receiver, but there will be little effect upon the damping of the transmitter. It will be noted that under all circumstances, the transducer element itself is isolated from both the transmitter and receiver by the matching transformer 7 and the transmission line 11, which between them act to isolate the transducer element to a large extent from the effect of circuit characteristics at the far end of the transmission line: indeed the use of a low impedance connection to the transducer is intended to have just that effect.

Referring now to FIG. 2, in which like reference numerals are used to denote like parts, it will be noted that both the transmitter, and the transceiver interface circuit, are connected directly to the transducer element, the transformer 7 and the transmission line being eliminated. This becomes possible when the transceiver is implemented integrally with the transducer.

Damping is applied to the transducer 8 when the transmitter is active by the parallel connected resistor 14 connected in parallel with the transducer via the limiting circuit formed by the back-to-back connected diodes 16 and 18. One or other of these diodes will conduct whenever the potential across them exceeds the forward conduction threshold of the diodes, typically less that 1 volt. Since the peak-to-peak potential applied to the transducer by the secondary of transformer 10, when the transmitter is active, is of the order of hundreds of volts, the diodes have a negligible effect on the damping applied by the resistor 14 during operation of the transmitter. The inductance of the secondary winding of the transformer is preferably selected to form a tuned circuit with the capacitance of the transformer, to which end a controlled air gap 12 may be introduced into the core of the transformer, both to control its inductance and prevent saturation, and to help provide consistent performance from the transformer/transducer combination.

Since there is no matching transformer between the resistor 14 and the transducer element 8, the resistor has a substantial damping effect upon the relatively high impedance transducer. Even though the resistor 14 may be of higher value (for example 5000Ω) than in the arrangement of FIG. 1, it will be of low value relative to the impedance of the transducer element. This is in contrast to the arrangement of FIG. 1, where the value of resistor 14 was much higher than the transformed impedance (400 ohms), of the transducer. The preamplifier 22 has a high input impedance at the transducer frequency, but the diodes 16 and 18, which serve to limit the potential appearing at the input to the receiver during transmission of a shot, and to determine a saturation level at the input of the receiver since signal excursions beyond the forward conduction thresholds of the diodes will be clipped, also complete a current path through the resistor 14 during transmission of a shot.

The fixed gain preamplifier 22, which may be provided with some bandpass characteristics, is followed in the receiver 24 by an active filter tuned so as to pass components of the received signal at or close to the transducer frequency, which in turn is followed by a logarithmic amplifier and precision rectifier to produce a signal proportional, on a logarithmic scale, to echo amplitude. An echo processing system (implemented by a programmed microcontroller)) then digitizes and processes the echo signal so as to recognize a true echo, using techniques similar to those described for example in my U.S. Pat. Nos. 4,831,565, 4,890,266 and 4,992,998.

At the input to the receiver, and in parallel with the diodes 16 and 18, is a further resistor 30 of lower resistance (typically 240 ohms) than the resistor 14, in series with the collector and emitter of a bipolar switching transistor 32, the base of which receives a signal from the microcontroller which determines whether or not the transistor is turned on. When the transistor is turned off, the resistor 30 has no effect. During receipt of an echo signal following transmission of a shot, and provided that the amplitude of the received signal is below the saturation level of the receiver as set by the clipping diodes 16 and 18, the received signal is applied directly to the preamplifier 22. The resistor 14 will be in series with the relatively high input impedance of the amplifier 22, and will have little effect on the amplitude of the signal. The tuned circuit formed by the transducer 8 and the transformer 10 will see only a high impedance formed by the resistor 14 and the input impedance of the amplifier in series, and therefore little damping will be applied to the transducer, thus maximizing its sensitivity to received echoes. When the transistor 32 is turned on, on the other hand, the resistors 14 and 30 form a potential divider at the input of the amplifier 22, and since the resistor 30 has a much smaller value (typically 240 ohms) than the resistor 14 (typically 5000 ohms), much the same degree of damping is applied to the transducer circuit as occurs during transmission. Thus the input to the receiver is not only attenuated to about 5% of its damped value, but the transducer is also damped to the same degree as during transmission.

Damping of the transducer, by switching on the transistor 32, is applied under two circumstances. When transmitting "short" shots to detect short range echoes, as described further in my U.S. Pat. No. 4,831,565, the expected return signals will be of high amplitude, and attenuation is therefore applied. When transmitting "long" shots to detect longer range echoes, damping will also be applied if the computer detects signal levels within the range being examined which are high enough to saturate the receiver. A substantial advantage of applying damping in this manner is not only that it greatly extends the effective dynamic range of the logarithmic amplifier 26, so that only one logarithmic amplifier need be used, but also that the ringdown time of the transducer can be greatly reduced by effective damping of the transducer, so that the minimum effective range of the system is substantially reduced.

Whilst only a single stage of damping has been described, several stages of damping could be applied by providing two or more individually controlled sets of resistors 30 and transistors 32, or replacing this group of components with a circuit providing a continuously controllable resistance.

In a preferred physical arrangement, the transmitter, receiver and transducer are integrated in a single housing 34. Since the characteristics of transducers are notoriously difficult to control accurately during manufacture, and substantial but unpredictable reactances can be introduced by connecting wiring if the transducer is located remotely from the transmitter and receiver, such an arrangement provides the potential of adjusting the combination of transformer and transducer as a unit during manufacture to provide a desired response and correct deviations in the characteristics of individual transducers. The inductance of the transformer can if required be adjusted by utilizing a transformer core having an air gap, adjustable for example by rotation of a screw threaded slug forming part of the core, or the reactance of the circuit could be adjusted using an adjustable capacitance.

I claim:

1. An acoustic pulse-echo ranging system comprising a transducer containing a high impedance piezoelectric transducer element, a transmitter for driving the transducer element, a receiver having an input for receiving signals from the transducer element, and a transceiver interface for placing said transmitter and said receiver continuously in connection with the transducer element, wherein the transceiver interface comprises a resistive network establishing a direct resistive connection between the transducer element and the receiver, the network further including an electronically controlled switching element for switching the network between two states, namely a first state in which the transducer element is coupled to the receiver through a first resistive element whose resistance is low compared with the impedance both of the receiver and the transducer such that the network neither substantially damps the transducer element nor attenuates the input to the receiver, and a second state in which the network substantially damps the transducer element and attenuates the input to the receiver by establishing, through a second resistive element, and additional resistive path directly in parallel with the transducer element and having a resistance which is low compared with the impedance of both the transducer and the receiver, and wherein the system includes a controller for controlling the switching element to select the state of the network according to the expected characteristics of an echo to be received by the receiver.

2. The system of claim 1, wherein the second resistive element is of substantially lower value than the first resistive element.

3. The system of claim 2, wherein oppositely polarized diodes are connected in parallel with the second resistive element and the switching element, and the transducer drives the transducer element at a level such that the diodes conduct alternately during operation of the transmitter to place the first resistive element in parallel with the transducer.

4. The system of claim 1, wherein the switching element is a switching transistor.

5. The system of claim 3, wherein the transducer, the transmitter, the receiver and the transceiver interface are located within a common housing.

6. The system of claim 1, wherein the transmitter is connected to the transducer through a transformer having a variable air gap.

* * * * *